UNITED STATES PATENT OFFICE.

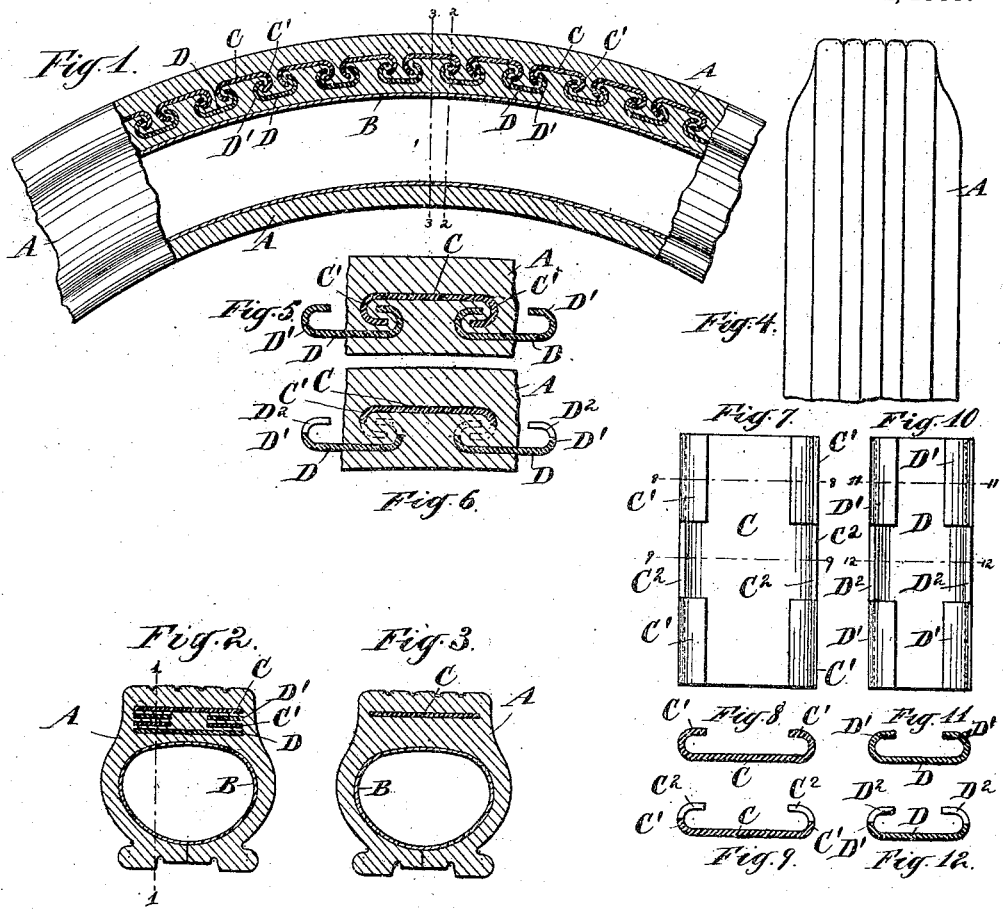

ACHILLES F. ANGELICOLA, OF NEW YORK, N. Y.

PNEUMATIC TIRE.

943,371.  Specification of Letters Patent.  Patented Dec. 14, 1909.

Application filed August 5, 1907, Serial No. 387,028.  Renewed February 18, 1909. Serial No. 478,620.

*To all whom it may concern:*

Be it known that I, ACHILLES F. ANGELICOLA, a subject of the King of Italy, residing in the city of New York, borough of Queens, in the county of Queens and State of New York, have invented a certain new and useful Improvement in Pneumatic Tires, of which the following is a specification.

The invention relates to that class of tires in which metal plates embedded in the tread of the tire are employed to prevent puncture, and the object of the invention is to provide a tire in which the plates are formed and located in such manner as to afford the desired protection without materially lessening resiliency, and in which the danger of abrading or cutting the material of the tire by displacement of the plates or movement of sharp edges thereof in service, is avoided.

The invention consists in certain novel features of construction and arrangement by which the above objects are attained, to be hereinafter described.

The accompanying drawings form a part of this specification and show preferred forms of the invention.

Figure 1 is a vertical section partly in elevation, showing a tire constructed in accordance with the invention. The plane of section is indicated by the line 1—1 in the succeeding figure. Fig. 2 is a transverse section of the tire on the line 2—2 in Fig. 1. Fig. 3 is a similar view on the line 3—3 in Fig. 1. Fig. 4 is an elevation showing a portion of the periphery of the tire. Fig. 5 is a section corresponding to a portion of Fig. 1, showing three interlocked plates on a larger scale. Fig. 6 is a similar view, the plane of section being the central peripheral line. Fig. 7 is a face view of one of the outer plates. Figs. 8 and 9 are cross-sections of the same taken on the lines 8—8 and 9—9 respectively. Fig. 10 is a face view of one of the inner plates. Figs. 11 and 12 are cross-sections on the lines 11—11 and 12—12 respectively in Fig. 10.

Similar letters of reference indicate like parts in all the figures.

A is a tire-casing which may be understood to be constructed of rubber and canvas as usual, and formed in any approved manner for attachment to the rim of a wheel for automobile or like service, and B is the usual inner tube inclosed thereby. For the purposes of this description the casing and tube may be considered as a whole and will be termed a tire.

C and D are plates of suitable material, preferably sheet steel, embedded in the outer or tread portion of the tire and extending in two interlocked series around the entire circumference. The plates of both series are similar but those of the outer series C C are preferably wider, or occupy more space peripherally, than the inner plates D D. The plates C comprise a plane portion having lugs or flanges $C^1$ $C^1$ on two opposite side-edges, curled toward each other on the inner face, and the plates D, of the same length but narrower, have corresponding lugs or flanges $D^1$ $D^1$ curled toward each other on the opposite sides of the outer face. The tire is molded and vulcanized with the plates located therein as shown, each outer plate C slightly separated from its neighbor and engaged therewith by an inner plate D through the interlocking of its lugs $D^1$ with the adjacent lugs $C^1$ on the adjoining outer plates. Actual contact of the interlocking lugs, and the resultant wear and cutting effect of the edges of the metal on the inclosing rubber, is avoided by so spacing the plates as to have each completely inclosed by the rubber independently; and for the purpose of anchoring the plates of both series against movement transversely of the tread, each plate is provided with a wide central notch or recess $C^2$ $D^2$ in the lugs $C^1$ $D^1$, which preserves the continuity of the rubber through both series and aids in maintaining the plates in the desired relative positions in the tire. The tire thus constructed is practically puncture-proof along the tread, and by making the latter as wide as practicable the vulnerable surfaces at the sides of the tire are correspondingly reduced; the flexibility of the inclosed armor avoids stiffness and the consequent reduction in resiliency. By inclosing each plate independently in the rubber of the tire abrasion is largely obviated, and by the reversed positions of the inner and outer plates relatively to each other, the cutting edges of the interlocking lugs cannot work either toward the periphery or toward the interior, the lugs on one plate being covered by the body or plane portion of the other, and movement of either plate radially is resisted by the broad surfaces presented.

Modifications may be made in the forms and proportions as found necessary or desirable in adapting the invention to various conditions.

I claim:

In a tire, a series of plates having at their adjacent edges oppositely curved lugs with the adjacent ends of adjacent lugs overlapping each other and extending in opposite directions substantially parallel with the body portions of the plates and in the direction of the length of the tire, said adjacent overlapped ends being oppositely notched to allow a portion of the rubber of the tire to extend unbrokenly therethrough.

In testimony that I claim the invention above set forth I affix my signature, in presence of two witnesses.

ACHILLES F. ANGELICOLA.

Witnesses:
CHARLES R. SEARLE,
CHARLES LEE MEYER.